United States Patent
Mu

(10) Patent No.: US 12,520,250 B2
(45) Date of Patent: Jan. 6, 2026

(54) CHANNEL DETECTION METHOD, CHANNEL DETECTION APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 384 days.

(21) Appl. No.: 18/245,520

(22) PCT Filed: Sep. 25, 2020

(86) PCT No.: PCT/CN2020/117862
§ 371 (c)(1),
(2) Date: Mar. 15, 2023

(87) PCT Pub. No.: WO2022/061749
PCT Pub. Date: Mar. 31, 2022

(65) Prior Publication Data
US 2023/0370980 A1    Nov. 16, 2023

(51) Int. Cl.
*H04W 52/36* (2009.01)
*H04W 72/044* (2023.01)
*H04W 72/1273* (2023.01)

(52) U.S. Cl.
CPC ..... *H04W 52/365* (2013.01); *H04W 72/0473* (2013.01); *H04W 72/1273* (2013.01)

(58) Field of Classification Search
CPC ........... H04W 52/365; H04W 72/0473; H04W 72/1273; H04W 72/20; H04W 56/0065; H04W 56/0075
See application file for complete search history.

(56) References Cited

U.S. PATENT DOCUMENTS

| | | | |
|---|---|---|---|
| 10,306,546 B2 | 5/2019 | Park et al. | |
| 10,915,853 B2 * | 2/2021 | Berk | G06N 20/00 |
| 2015/0272509 A1 * | 10/2015 | Kwon | G06N 7/01 |
| | | | 600/509 |
| 2015/0282074 A1 | 10/2015 | Szabo et al. | |
| 2016/0269996 A1 * | 9/2016 | Wu | H04W 52/0216 |
| 2020/0136975 A1 | 4/2020 | Arora et al. | |

FOREIGN PATENT DOCUMENTS

| | | |
|---|---|---|
| CN | 102215552 A | 10/2011 |
| CN | 104349458 A | 2/2015 |
| CN | 104602328 A | 5/2015 |
| CN | 105659514 A | 6/2016 |

(Continued)

OTHER PUBLICATIONS

"Remaining issues on the Power Saving Signals/Channels," Proceedings of the 3GPP TSG RAN WG1 Meeting #100, CATT, R1-2000537, Feb. 24, 2020, e-Meeting, 5 pages.

*Primary Examiner* — John J Lee
(74) *Attorney, Agent, or Firm* — McCoy Russell LLP

(57) ABSTRACT

A channel detection method is applied to a terminal, and includes: determining a first prediction model, the first prediction model being used for predicting a service execution time of a terminal; and according to the service execution time predicted by the first prediction model, determining a channel detection occasion.

16 Claims, 6 Drawing Sheets

(56) References Cited

FOREIGN PATENT DOCUMENTS

| | | | |
|---|---|---|---|
| CN | 109472412 A | | 3/2019 |
| CN | 109787710 A | | 5/2019 |
| CN | 110147878 A | | 8/2019 |
| CN | 110365503 A | | 10/2019 |
| CN | 110958622 A | | 4/2020 |
| CN | 110958668 A | | 4/2020 |
| CN | 111612215 A | * | 9/2020 |
| CN | 111901855 A | | 11/2020 |

* cited by examiner

CHANNEL DETECTION METHOD, CHANNEL DETECTION APPARATUS, AND STORAGE MEDIUM

CROSS REFERENCE TO RELATED APPLICATION

The present application is a U.S. National Phase of International Application No. PCT/CN2020/117862 entitled "CHANNEL DETECTION METHOD, CHANNEL DETECTION APPARATUS, AND STORAGE MEDIUM," and filed on Sep. 25, 2020. The entire contents of each of the above-listed applications are hereby incorporated by reference for all purposes.

BACKGROUND

In a communication system, the network can manage a detection occasion of a physical downlink control channel (PDCCH) in two ways. One way is to configure discontinuous reception (DRX), and at a terminal service activation moment, the PDCCH is detected; and the other way is to configure a detection time unit of the PDCCH, the network configures a detection period of the PDCCH for a terminal, and the configuration of parameters mainly depends on semi-static signaling.

SUMMARY

According to a first aspect of an example of the disclosure, a channel detection method is provided, performed by a terminal, and includes:
  determining a first prediction model, and the first prediction model being configured to predict a service execution time of the terminal; and determining, according to the service execution time predicted by the first prediction model, a channel detection occasion.

According to a second aspect of an example of the disclosure, a channel detection method is provided, performed by a network side device, and includes:
  determining a first prediction model, and the first prediction model being configured to predict a service execution time of a terminal; and determining, according to the service execution time predicted by the first prediction model, a channel detection occasion.

According to a third aspect of an example of the disclosure, a channel detection apparatus is provided and includes:
  a processor; and a memory configured to store executable instructions of the processor; the processor being configured to execute the channel detection method in the first aspect or any one of implementations in the first aspect, or configured to execute the channel detection method in the second aspect or any one of implementations in the second aspect.

According to a fourth aspect of an example of the disclosure, a non-temporary computer readable storage medium is provided, in response to determining that instructions in the storage medium are executed by a processor of a mobile terminal, the mobile terminal can execute the channel detection method in the first aspect or any one of implementations in the first aspect, or execute the channel detection method in the second aspect or any one of implementations in the second aspect.

It should be understood that the general description above and detailed description below are merely illustrative and explanatory, and cannot limit the disclosure.

BRIEF DESCRIPTION OF THE DRAWINGS

The accompanying drawing here are incorporated into and form a part of the specification, show examples conforming to the disclosure, and are used to explain principles of the disclosure with the specification together.

DETAILED DESCRIPTION

Figure 1:
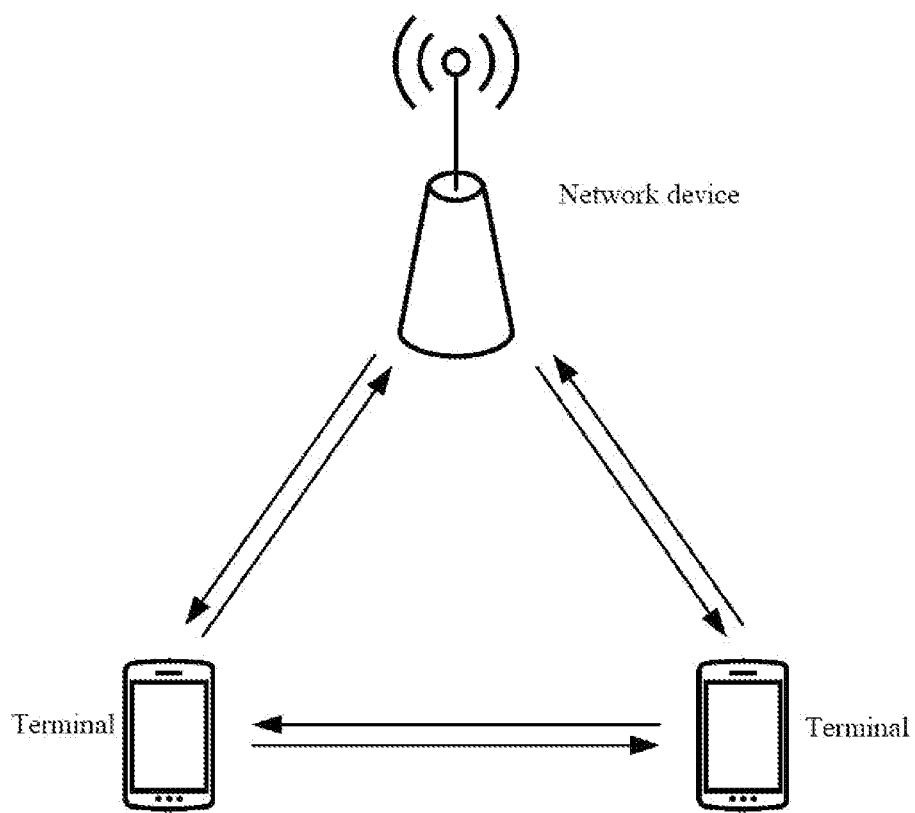
FIG. 1 is a communication system framework diagram of a network device and a user device shown according to an example.

Examples will be described in detail here, as exemplified in the accompanying drawings. When the following description refers to the accompanying drawings, unless otherwise indicated, the same number in different accompanying drawings indicates the same or similar elements. The examples described in the examples below do not represent all examples consistent with the disclosure. Rather, the examples are merely examples of apparatuses and methods that are consistent with some aspects of the disclosure as detailed in the appended claims.

The disclosure relates to the technical field of wireless communication, in particular to a channel detection method, a channel detection apparatus and a storage medium.

In a wireless communication system, a detection occasion of a PDCCH depends on configuration of the network. In the related art, a communication system network side device may manage the detection occasion of the PDCCH in two ways. One way is to configure DRX, the specific implementation includes that a terminal is configured at the network side device to detect the occasion of the PDCCH, and the terminal may try to detect the PDCCH at the detection occasion of the PDCCH. The other way is that DRX is not configured in the terminal or a detection time unit of the PDCCH is configured in an active time of the DRX. Thus, the above two ways to detect the PDCCH are both similar to periodic detection of the PDCCH. The network side device may configure the duration of a PDCCH detection period, and configure a specific occasion for detecting the PDCCH within one period.

Generally, the network side may configure parameters for detecting the PDCCH according to the statistic characteristics of terminal services. For example, in response to determining that the network side device determines that the terminal services are relatively intensive, at the moment, the network side device configures a shorter period for detecting the PDCCH for the terminal. In response to determining that the network side device determines that the terminal services are relatively sparse, at the moment, the network side device configures a longer period for detecting the PDCCH for the terminal. In addition, the parameters for detecting the PDCCH are configured for the terminal through semi-static signaling. Dynamic signaling may also be used for indicating the terminal to switch the parameters for detecting the PDCCH.

However, in practical transmitting, terminal service generation does not occur periodically, so in the related art, the ways for detecting the PDCCH do not adapt to the service characteristics of the terminal. In addition, signaling is used for configuring the related parameters for detecting the PDCCH for the terminal and indicating the terminal to switch the parameters for detecting the PDCCH, switching delay occurs, service changes cannot be accurately tracked, and signaling overhead may further be increased. That is, in practical transmitting, service generation does not happen periodically. In addition, switching depends on signaling configuration parameters, switching delay occurs, and service changes cannot be accurately tracked.

Based on the problems involved in the above examples, by using a machine learning technology of artificial intelligence, the disclosure provides a channel detection method. The artificial intelligence technology is good at discovering the inherent features and connections in data, generating corresponding models, and making corresponding predictions and adjustments with the generated models. Thus, according to the disclosure, all kinds of service data, user data features and function saving parameters to drive the machine learning technology, form the optimal parameter configuration model for all kinds of service data and users, and provide more detailed and personalized power saving schemes. In addition, the channel detection method provided by the disclosure may further predict all kinds of service data, user data, network states and the like, and adaptively adjust the occasion for detecting the PDCCH. Connections and models between communications are established through the machine learning technology, related flows are further optimized, and the power overhead may be effectively saved.

FIG. 1 is a communication system framework diagram of a network device and a user device shown according to an example. The channel detection method provided by the disclosure may be applied to the communication system framework diagram shown in FIG. 1. As shown in FIG. 1, a base station may configure a prediction model for a terminal to send a message indicating the prediction model used by the terminal. The terminal determines to configure the prediction model according to instructions sent by the base station, or determines the used prediction model.

It may be understood that the communication system of a network device and the terminal shown in FIG. 1 is only illustrative, the wireless communication system may further include other network devices, for example, the wireless communication system may further include a core network device, a wireless relay device, a wireless backhaul device and the like, which is not drawn in FIG. 1. According to the examples of the disclosure, the quantity of network devices and the quantity of terminals included in the wireless communication system are not limited.

It may further be understood that the wireless communication system of the example of the disclosure is a network for providing a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. The network may be divided into a 2G (generation) network, a 3G network, a 4G network or a future evolution network according to factors such as the capacity, rate and delay of different networks, such as a 5G network, and the 5G network may also be called a new radio (NR). For convenience of description, according to the disclosure, the wireless communication network is called a network for short sometimes.

Further, the network device involved in the disclosure may also be called a wireless access network device. The wireless access network device may be a base station, an evolved node B base station, a family base station, an access point (AP) in a wireless fidelity (WIFI) system, a wireless relay node, a wireless backhaul node, a transmission point (TP) or a transmission and reception point (TRP) and the like, may also be a gNB in a NR system, or may also be components constituting the base station or a part of devices and the like. In response to determining that the wireless access network device is an Internet of Vehicle (V2X) communication system, the network device may further be a vehicle device. It may be understood that in the examples of the disclosure, the specific technology and specific device form adopted by the network device are not limited.

Further, the terminal involved in the disclosure may also be called a terminal device, a user equipment (UE), a mobile station (MS), a mobile terminal (MT) and the like, and is a device for providing voice and/or data connectivity for a user, for example, the terminal may be a handheld device with a wireless connection function, a vehicle device and the like. At present, the terminal may be a mobile phone, a pocket personnel computer (PPC), a palm computer, a personnel digital assistant (PDA), a notebook computer, a tablet personnel computer, a wearable device, or a vehicle device and the like. In addition, in response to determining that the terminal is an Internet of Vehicle (V2X) communication system, the terminal device may further be a vehicle device. It may be understood that in the examples of the disclosure, the specific technology and specific device form adopted by the terminal are not limited.

In some examples of the disclosure, a channel detection method is provided.

Figure 2:
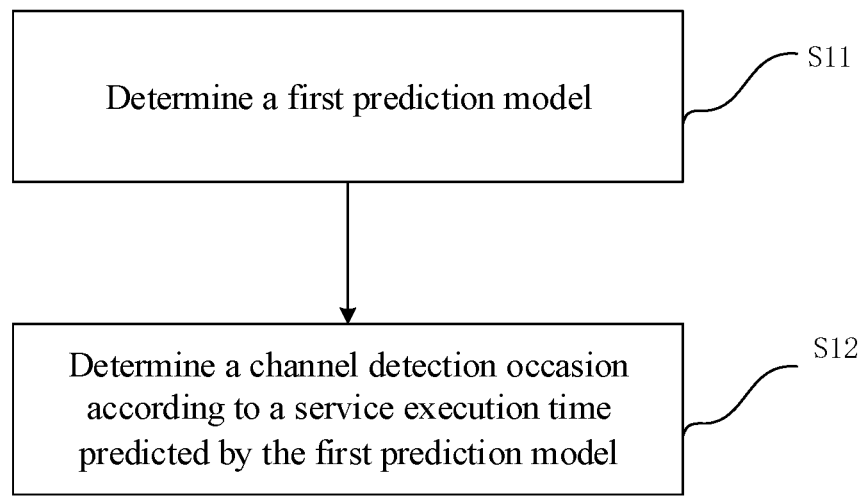
FIG. 2 is a flow diagram of a channel detection method shown according to an example.

FIG. 2 is a flow diagram of a channel detection method shown according to an example, and as shown in FIG. 2, the channel detection method is performed by user equipment (UE), and includes the following steps.

In step S11, a first prediction model is determined.

In step S12, a channel detection occasion is determined according to a service execution time predicted by the first prediction model.

In the example of the disclosure, the first prediction model is configured to predict the service execution time of the terminal. The terminal determines the possible service execution time based on the first prediction model. In some examples of the disclosure, the possible service execution time of the terminal determined by the first prediction model may include a next possible service occurrence occasion, and/or a service duration; or all possible services of the terminal within a period of time, and/or a duration corresponding to each service. According to the service execution time predicted by the first prediction model, the channel detection occasion of the PDCCH is determined.

In an example of the disclosure, the prediction model is obtained by training in advance based on service feature data and service execution time. The input of the prediction model obtained by training based on the service feature data and the service execution time is the service feature data, and output is the service execution time. In other words, the prediction model is a mapping relationship between the service feature data and the service execution time, the service execution time corresponding to the feature data may be determined through a certain feature data in the service feature data, and the channel detection occasion of the PDCCH is further determined according to the determined service execution time.

In the example of the disclosure, the service feature data include one or a combination of the following:

a service type, a first service occurrence moment, a first service duration, a service interval time, a channel condition, terminal reception capacity, a terminal cell, a terminal using habit, and a moving track.

The service execution time includes one or a combination of the following: a second service occurrence moment and a second service duration.

It may be understood that the service feature data and the service execution time used by a training model are all historical data, a connection or the corresponding mapping relationship existing between the service feature data and the service execution time is determined through the occurred historical service feature data and the service execution time, so that the prediction model which may predict the terminal service execution time is obtained.

In an example of the disclosure, according to the determined first prediction model, the terminal inputs one or more service feature data of the first service occurrence moment, the service type, the terminal service trigger operation and the like in the service feature data, and the first prediction model deduces a possible service occurrence occasion according to the input service feature data; and the second service occurrence moment of the terminal is determined, or all possible service occurrence moments of the terminal within a period of time are determined. The second service occurrence moment is the next possible service occurrence moment of the input first service occurrence moment. For convenient description in the disclosure, the next possible service occurrence moment based on the first service occurrence moment is called a second service occurrence moment.

In some examples of the disclosure, one or a plurality of prediction models are obtained by training through the service feature data and the service execution time of the terminal. If the service occurrence time of the terminal within different periods of time has a relatively large difference, a plurality of prediction models may be trained according to the terminal service occurrence time. For example, one way is that the terminal service occurrence time has a relatively obvious difference in morning, at noon and in the evening every day, such as the occurred service type or the frequency of service occurrence. For features of the terminal, the plurality of prediction models may be trained based on the service feature data and the service execution time corresponding to the terminal, and the plurality of trained prediction models may be respectively suitable for different periods of time. In response to determining that the prediction models are configured to predict the possible service execution time of the terminal, a network side device indicates the prediction models used by the terminal. Or, the other way is that the terminal service occurrence time is almost the same, a prediction model may be trained according to the service feature data and the service execution time corresponding to the terminal. In response to determining that the possible service execution time of the terminal is predicted, the prediction model is used, and the used prediction model does not need to be selected.

In an example of the disclosure, if the terminal configures the plurality of prediction models, on way is that the used first prediction model is determined in the plurality of prediction models according to a received first indication message sent by the network side, and the first indication message includes an indicator used for indicating the first prediction model. The terminal determines the first prediction model corresponding to the indicator according to the indicator used for indicating the first prediction model included in the first indication message, and predicts the service execution time based on the first prediction model. It may be understood that the indicator used for indicating the first prediction model may be a dominant indicator, such as a bit and a symbol, and may also be a recessive indication, for example, the used first prediction model is determined implicitly by certain signaling.

The other way is that the terminal determines the first prediction model matched with a current terminal trigger operation from the plurality of prediction models according to the corresponding relationship of the own trigger operation and the prediction model, and uses the determined first prediction model to predict the service execution time of the terminal. In the examples of the disclosure, the terminal trigger operation includes switching of terminal scenes, trigger of services and the like. For example, in response to determining that the terminal scenes are turned into a static scene from a commuting scene, the prediction model predicting the service execution time of the terminal matched with the commuting scene is switched into a prediction model matched with the static scene, the prediction model matched with the static scene is determined as a first prediction model, and the service execution time of the terminal is predicted according to the first prediction model. Or, in response to determining that the terminal execution service is changed, the prediction model is determined to be switched; for example, in response to determining that the terminal execution service is switched into a chatting service from a video service, a prediction model matched with the video service is determined to be switched into a prediction model matched with the chatting service, the prediction model matched with the chatting service is determined as a first prediction model, and the first prediction model matched with the chatting service is further determined to be configured to predict the service execution time of the terminal.

It may be understood that for switching of the prediction model, the terminal may automatically switch the used prediction model, or a network side device may indicate the terminal to switch the used prediction model. In response to determining that the terminal automatically detects switching of the scenes or switching of execution services exists and it is determined that the used prediction model needs to be switched, the switched prediction model is reported to the network side device, the network side device keeps synchronous switching according to the switched prediction model reported by the terminal, so as to ensure that the terminal and the network side device use the same prediction model. In response to determining that the network side device determines that the terminal scenes are changed or the execution services are changed, the network side device sends an indication message and informs the switched prediction model, and in the same way, the terminal keeps synchronous switching according to the indication message of the network side device to determine the used first prediction model.

In the example of the disclosure, as the terminal and the network side device use the same prediction model, in response to determining that the terminal determines the detection occasion of the PDCCH, the network side device may synchronize with the terminal, so that control signaling associated with the detection occasion of the PDCCH does not need to be sent to achieve an effect of saving signaling resources.

In an example, the corresponding relationship of the trigger operation and the prediction model may be configured in advance, for example, may be specified by communication protocols, factory pre-set by a device manufacturer, or may be determined through negotiation between the network side device and the terminal before determining or switching the prediction model. The terminal or the network side device may each determine the prediction model to be applied based on the corresponding relationship.

In the example of the disclosure, a training model may be trained at the terminal according to the service feature data and the service execution time of the terminal, or may be trained at the network side device. In response to determining that the training model is trained at the network side device according to the service feature data and the service execution time of the terminal, the network side device configures the prediction model for the terminal according to the terminal type or terminal service occurrence type. The network side device sends a second indication message, and the second indication message is used for indicating the terminal to configure a plurality of prediction models. The terminal downloads the plurality of prediction models locally according to a download position of the plurality of prediction models included in the second received indication message, or downloads the plurality of prediction models trained at the network side device to the terminal locally according to predefined information, such as protocol stipulation or the signaling pre-configured by a base station. The terminal determines the used first prediction model according to the plurality of configured prediction models.

In an example of the disclosure, the service occurrence moment included in the service execution time is determined according to the first prediction model. According to the above example, it may be known that the service execution time determined by the first prediction model includes at least one service occurrence moment. The at least one service occurrence moment included in the service execution time is determined as a detection occasion of the PDCCH, and at the moment, the terminal detects data on the determined detection occasion of the PDCCH, so as to save the power overhead.

In an example of the disclosure, the service occurrence moment included in the service execution time is determined according to the first prediction model. According to the above example, it may be known that the service execution time determined by the first prediction model includes at least one service occurrence moment. The at least one service occurrence moment included in the determined service execution time is amended through the signaling or communication protocols configured by the network side device. The amended at least one service occurrence moment is determined as the detection occasion of the PDCCH, and at the moment, the terminal detects data on the determined detection occasion of the PDCCH, so as to save the power overhead.

In the example of the disclosure, the network side device (such as a base station) updates the configured one or more prediction models according to generated new data, and/or retrains at least one prediction model, and tests the updated one or more prediction models and/or new prediction models. In response to determining that the updated one or more prediction models and/or new prediction models pass the test and may operate stably, the network side device sends a third indication message, and the third indication message is used for indicating the terminal to reconfigure one or more prediction models. According to the above examples, it may be understood that the network side device indicates the terminal to reconfigure one or more prediction models, the terminal may reconfigure the updated one or more prediction models based on the original prediction models, may also reconfigure the new one or more prediction models, and may further reconfigure the updated one or more prediction models, the new one or more prediction models and the like, and the terminal determines the reconfigured one or more prediction models according to the received third indication message.

In an example of the disclosure, in response to determining that the network side device determines that the prediction model is not used, the signaling may be sent to indicate the terminal to use the configured DRX or the configured detection time unit of the PDCCH for data detection. In the examples of the disclosure, the network side device may indicate the terminal to not use the prediction model to determine the detection occasion of the PDCCH by sending a fourth indication message. The fourth indication message is used for indicating the terminal to activate and use the prediction model. For example, in response to determining that a general moving track or a general activity place of the terminal is changed, the configured prediction model is not used, and at the moment, the network side sends the fourth indication message to indicate the terminal to activate and use the prediction model.

Based on the same or similar conception, an example of the disclosure further provides a channel detection method.

Figure 3:
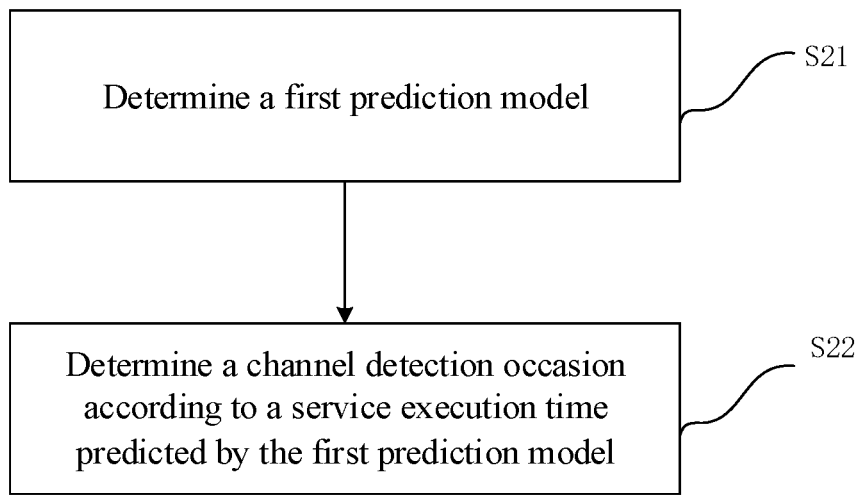
FIG. 3 is a flow diagram of another channel detection method shown according to an example.

FIG. 3 is a flow diagram of a channel detection method shown according to an example, and as shown in FIG. 3, the channel detection method is performed by a network device, and includes the following steps.

In step S21, a first prediction model is determined.

In step S22, a channel detection occasion is determined according to a service execution time predicted by the first prediction model.

In the example of the disclosure, the first prediction model is configured to predict the service execution time of a terminal. The terminal determines the possible service execution time based on the first prediction model. In some examples of the disclosure, the possible service execution time of the terminal determined by the first prediction model may include a next possible service occurrence occasion, and/or a service duration; or all possible services of the terminal within a period of time, and/or a duration corresponding to each service. According to the service execution time predicted by the first prediction model, a channel detection occasion of a PDCCH is determined.

In an example of the disclosure, the prediction model is obtained by training in advance based on service feature data and the service execution time. The input of the prediction model obtained by training based on the service feature data and the service execution time is the service feature data, and output is the service execution time. In other words, the prediction model is a mapping relationship between the service feature data and the service execution time, the service execution time corresponding to the feature data may be determined through a certain feature data in the service feature data, and the channel detection occasion of the PDCCH is further determined according to the determined service execution time.

In the example of the disclosure, the service feature data include one or a combination of the following:

a service type, a first service occurrence moment, a first service duration, a service interval time, a channel condition, terminal reception capacity, a terminal cell, a terminal using habit, and a moving track.

The service execution time includes one or a combination of the following: a second service occurrence moment and a second service duration.

It may be understood that the service feature data and the service execution time used by the training model are all historical data, through the occurred historical service feature data and the service execution time, a connection or a corresponding mapping relationship existing between the service feature data and the service execution time is determined, so as to obtain the prediction model predicting the terminal service execution time.

In an example of the disclosure, according to the determined first prediction model, the terminal inputs one or more service feature data of the first service occurrence moment, the service type, the terminal service trigger operation and the like in the service feature data, and the first prediction model deduces the possible service occurrence occasion according to the input service feature data; and the second service occurrence moment of the terminal is determined, or all possible service occurrence moments of the terminal within a period of time are determined. The second service occurrence moment is the next possible service occurrence moment of the input first service occurrence moment, for convenient description in the disclosure, the next possible service occurrence moment based on the first service occurrence moment is called the second service occurrence moment.

In some examples of the disclosure, one or a plurality of prediction models may be obtained by training through the service feature data and the service execution time of the terminal. In response to determining that the service occurrence time of the terminal within different periods of time has a relatively large difference, the plurality of prediction models may be trained according to the terminal service occurrence time. For example, one way is that the terminal service occurrence time has a relatively obvious difference in morning, at noon and in the evening every day, such as the occurred service type or the frequency of service occurrence. For features of the terminal, the plurality of prediction models may be trained based on the service feature data and the service execution time corresponding to the terminal, and the plurality of trained prediction models may be respectively suitable for different periods of time. In response to determining that the prediction models are configured to predict the possible service execution time of the terminal, a network side device indicates the prediction models used by the terminal. Or, the other way is that the terminal service occurrence time is almost the same, a prediction model may be trained according to the service feature data and the service execution time corresponding to the terminal. In response to determining that the possible service execution time of the terminal is predicted, the prediction model is used, and the used prediction model does not need to be selected.

In an example of the disclosure, when the terminal configures the plurality of prediction models, on way is that the used first prediction model is determined in the plurality of prediction models according to a received first indication message sent by the network side, and the first indication message includes an indicator used for indicating the first prediction model. The terminal determines the first prediction model corresponding to the indicator according to the indicator used for indicating the first prediction model included in the first indication message, and predicts the service execution time based on the first prediction model. It may be understood that the indicator used for indicating the first prediction model may be a dominant indicator, such as a bit and a symbol, and may also be a recessive indication, for example, the used first prediction model is determined implicitly by certain signaling.

The other way is that the terminal determines the first prediction model matched with a current terminal trigger operation from the plurality of prediction models according to the corresponding relationship of the own trigger operation and the prediction model, and uses the determined first prediction model to predict the service execution time of the terminal. In the examples of the disclosure, the terminal trigger operation includes switching of terminal scenes, trigger of services and the like. For example, in response to determining that the terminal scenes are turned into a static scene from a commuting scene, the prediction model predicting the service execution time of the terminal matched with the commuting scene is switched into a prediction model matched with the static scene, the prediction model matched with the static scene is determined as a first prediction model, and the service execution time of the terminal is predicted according to the first prediction model. Or, in response to determining that the terminal execution service is changed, the prediction model is determined to be switched; for example, in response to determining that the terminal execution service is switched into a chatting service from a video service, a prediction model matched with the video service is determined to be switched into a prediction model matched with the chatting service, the prediction model matched with the chatting service is determined as a first prediction model, and the first prediction model matched with the chatting service is further determined to be configured to predict the service execution time of the terminal.

It may be understood that for switching of the prediction model, the terminal may automatically switch the used prediction model, or a network side device may indicate the terminal to switch the used prediction model. In response to determining that the terminal automatically detects switching of the scenes or switching of execution services exists, and it is determined that the used prediction model needs to be switched, the switched prediction model is reported to the network side device, the network side device keeps synchronous switching according to the switched prediction model reported by the terminal, so as to ensure that the terminal and the network side device use the same prediction model. In response to determining that the network side device determines that the terminal scenes are changed or the execution services are changed, the network side device sends an indication message and informs the switched prediction model, and in the same way, the terminal keeps synchronous switching according to the indication message of the network side device to determine the used first prediction model.

In the example of the disclosure, as the terminal and the network side device use the same prediction model, in response to determining that the terminal determines the detection occasion of the PDCCH, the network side device may synchronize with the terminal, so that control signaling associated with the detection occasion of the PDCCH does not need to be sent to achieve an effect of saving signaling resources.

In an example, the corresponding relationship of the trigger operation and the prediction model may be configured in advance, for example, may be specified by communication protocols, factory pre-set by a device manufacturer, or may be determined through negotiation between the network side device and the terminal before determining or switching the prediction model. The terminal or the network side device may each determine the prediction model to be applied based on the corresponding relationship.

In the example of the disclosure, a training model may be trained at the terminal according to the service feature data and the service execution time of the terminal, or may be trained at the network side device. In response to determining that the training model is trained at the network side device according to the service feature data and the service execution time of the terminal, the network side device configures the prediction model for the terminal according to the terminal type or terminal service occurrence type. The network side device sends a second indication message, and the second indication message is used for indicating the terminal to configure a plurality of prediction models. The terminal downloads the plurality of prediction models locally according to a download position of the plurality of prediction models included in the second received indication message, or downloads the plurality of prediction models trained at the network side to the terminal locally according to predefined information, such as protocol stipulation or the signaling pre-configured by a base station. The terminal determines the used first prediction model according to the plurality of configured prediction models.

In an example of the disclosure, the service occurrence moment included in the service execution time is determined according to the first prediction model. According to the above example, it may be known that the service execution time determined by the first prediction model includes at least one service occurrence moment. The at least one service occurrence moment included in the service execution time is determined as a detection occasion of the PDCCH, and at the moment, the terminal detects data on the determined detection occasion of the PDCCH, so as to save the power overhead.

In an example of the disclosure, the service occurrence moment included in the service execution time is determined according to the first prediction model. According to the above example, it may be known that the service execution time determined by the first prediction model includes at least one service occurrence moment. The at least one service occurrence moment included in the determined service execution time is amended through the signaling or communication protocols configured by the network side device. The amended at least one service occurrence moment is determined as the detection occasion of the PDCCH, and at the moment, the terminal detects data on the determined detection occasion of the PDCCH, so as to save the power overhead.

In the example of the disclosure, the network side device (such as a base station) updates the configured one or more prediction models according to generated new data, and/or retrains at least one prediction model, and tests the updated one or more prediction models and/or new prediction models. In response to determining that the updated one or more prediction models and/or new prediction models pass the test and may operate stably, the network side device sends a third indication message, and the third indication message is used for indicating the terminal to reconfigure one or more prediction models. According to the above examples, it may be understood that the network side device indicates the terminal to reconfigure one or more prediction models, the terminal may reconfigure the updated one or more prediction models based on the original prediction models, may also reconfigure the new one or more prediction models, and may further reconfigure the updated one or more prediction models, the new one or more prediction models and the like, and the terminal determines the reconfigured one or more prediction models according to the received third indication message.

In an example of the disclosure, in response to determining that the network side device determines that the prediction model is not used, the signaling may be sent to indicate the terminal to use the configured DRX or the configured detection time unit of the PDCCH for data detection. In the examples of the disclosure, the network side device may indicate the terminal to not use the prediction model to determine the detection occasion of the PDCCH by sending a fourth indication message. The fourth indication message is used for indicating the terminal to activate and use the prediction model. For example, in response to determining that a general moving track or a general activity place of the terminal is changed, the configured prediction model is not used, and at the moment, the network side sends the fourth indication message to indicate the terminal to activate and use the prediction model.

Based on the same conception, an example of the disclosure further provides a channel detection apparatus.

It may be understood that the channel detection apparatus provided by the example of the disclosure includes corresponding hardware structures and/or software modules executing each function in order to achieve the above functions. In combination with units and algorithm steps of all examples disclosed in the example of the disclosure, the example of the disclosure may be implemented in a form of hardware or a combination of hardware and computer software. Whether a certain function is executed in a mode of hardware or computer software driving the hardware depends on the specific application of the technical solution and design constraint conditions. Those skills in the art may use different methods to implement the described function for each specific application, however, the implementation should not be considered out of the scope of the technical solution of the example of the disclosure.

Figure 4:
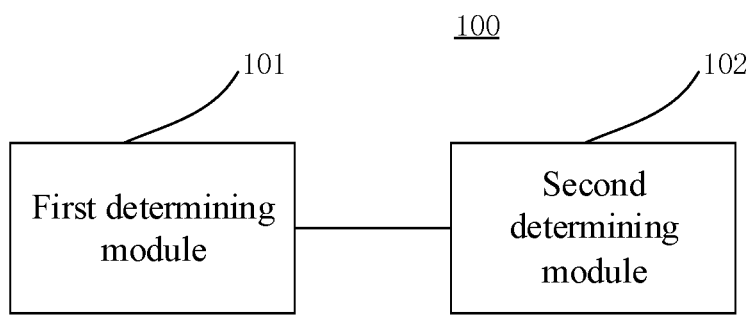
FIG. 4 is a block diagram of a channel detection apparatus shown according to an example.

FIG. 4 is a block diagram of a channel detection apparatus 100 shown according to an example. Referring to FIG. 4, the apparatus includes a first determining module 101 and a second determining module 102.

The first determining module 101 is configured to determine a first prediction model, and the first prediction model is configured to predict a service execution time of a terminal. The second determining module 102 is configured to determine, according to the service execution time predicted by the first prediction model, a channel detection occasion.

In the example of the disclosure, the prediction model is obtained by training in advance based on service feature data and the service execution time, the service feature data are an input of the prediction model, and the service execution time is an output of the prediction model.

In the example of the disclosure, the service feature data include one or a combination of the following: a service type, a first service occurrence moment, a first service duration, a service interval time, a channel condition, terminal reception capacity, a terminal cell, a terminal using habit, and a moving track. The service execution time includes one or a combination of the following: a second service occurrence moment and a second service duration.

In the example of the disclosure, the first determining module 101 is configured to determine the first prediction model from a plurality of prediction models.

In the example of the disclosure, the first determining module 101 is configured to determine, based on a received first indication message, the first prediction model from a plurality of prediction models, and the first indication message includes an indicator used for indicating the first prediction model.

Or, based on the corresponding relationship between the terminal trigger operation and the prediction model, the first prediction model matched with a current terminal trigger operation is determined from the plurality of prediction models.

In the example of the disclosure, the first determining module 101 is further configured to receive a second indication message, and the second indication message is used for indicating the plurality of prediction models for the terminal.

In the example of the disclosure, the first determining module 101 is further configured to download, based on a download position of the plurality of prediction models included in the second indication message, the plurality of prediction models.

Or, based on a download position included by predefined information, the plurality of prediction models are downloaded.

In the example of the disclosure, the second determining module 102 is configured to determine at least one service occurrence moment included in the service execution time, and determine the at least one service occurrence moment as a detection occasion of a physical downlink control channel (PDCCH).

In the example of the disclosure, the second determining module 102 is configured to determine at least one service occurrence moment included in the service execution time, amend the at least one service occurrence moment, and determine the amended at least one service occurrence moment as a detection occasion of a physical downlink control channel (PDCCH).

In the example of the disclosure, the first determining module 101 is further configured to receive a third indication message, and the third indication message is used for indicating the terminal to reconfigure one or more prediction models. According to the third indication message, the reconfigured one or more prediction models are determined.

In the example of the disclosure, the first determining module 101 is further configured to receive a fourth indication message, and the fourth indication message is used for indicating the terminal to activate and use the prediction models.

Figure 5:
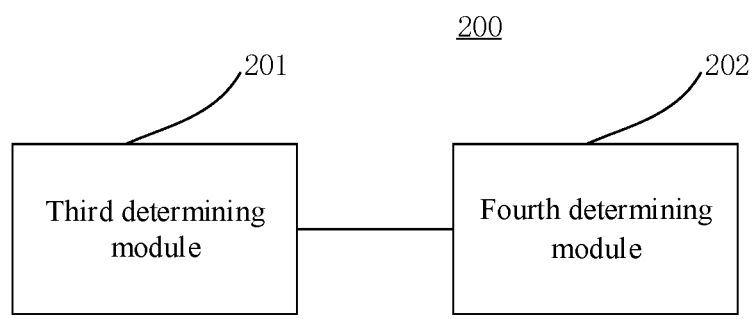
FIG. 5 is a block diagram of another channel detection apparatus shown according to an example.

FIG. 5 is a block diagram of a channel detection apparatus 200 shown according to an example. Referring to FIG. 5, the apparatus is applied to a network side device, and includes a third determining module 201 and a fourth determining module 202.

The third determining module 201 is configured to determine a first prediction model, and the first prediction model is configured to predict a service execution time a terminal. The fourth determining module 202 is configured to determine, according to the service execution time predicted by the first prediction model, a channel detection occasion.

In the example of the disclosure, the prediction model is obtained by training in advance based on service feature data and the service execution time, the service feature data are an input of the prediction model, and the service execution time is an output of the prediction model.

In the example of the disclosure, the service feature data include one or a combination of the following: a service type, a first service occurrence moment, a first service duration, a service interval time, a channel condition, terminal reception capacity, a terminal cell, a terminal using habit, and a moving track.

The service execution time includes one or a combination of the following: a second service occurrence moment and a second service duration.

In the example of the disclosure, the third determining module 201 is configured to determine the first prediction model from the plurality of prediction models.

In the example of the disclosure, the third determining module 201 is configured to determine, based on a sent first indication message, the first prediction model from the plurality of prediction models, and the first indication message includes an indicator used for indicating the first prediction model.

Or, based on the corresponding relationship between the terminal trigger operation and the prediction model, the first prediction model matched with the current terminal trigger operation is determined from the plurality of prediction models.

In the example of the disclosure, the third determining module 201 is further configured to send a second indication message, and the second indication message is used for indicating the plurality of prediction models for the terminal.

In the example of the disclosure, the fourth determining module 202 is configured to determine at least one service occurrence moment included in the service execution time, and determine the at least one service occurrence moment as a detection occasion of a physical downlink control channel (PDCCH).

In the example of the disclosure, the fourth determining module 202 is configured to determine at least one service occurrence moment included in the service execution time, amend the at least one service occurrence moment, and determine the amended at least one service occurrence moment as a detection occasion of a physical downlink control channel (PDCCH).

In the example of the disclosure, the third determining module 201 is further configured to send a third indication message, and the third indication message is used for indicating the terminal to reconfigure one or more prediction models.

In the example of the disclosure, the third determining module 201 is further configured to send a fourth indication message, and the fourth indication message is used for indicating the terminal to activate and use the prediction models.

With respect to the apparatus in the above example, the specific manner in each module executing operation has been described in detail in the example related to the method, and will not be illustrated in detail here.

Figure 6:
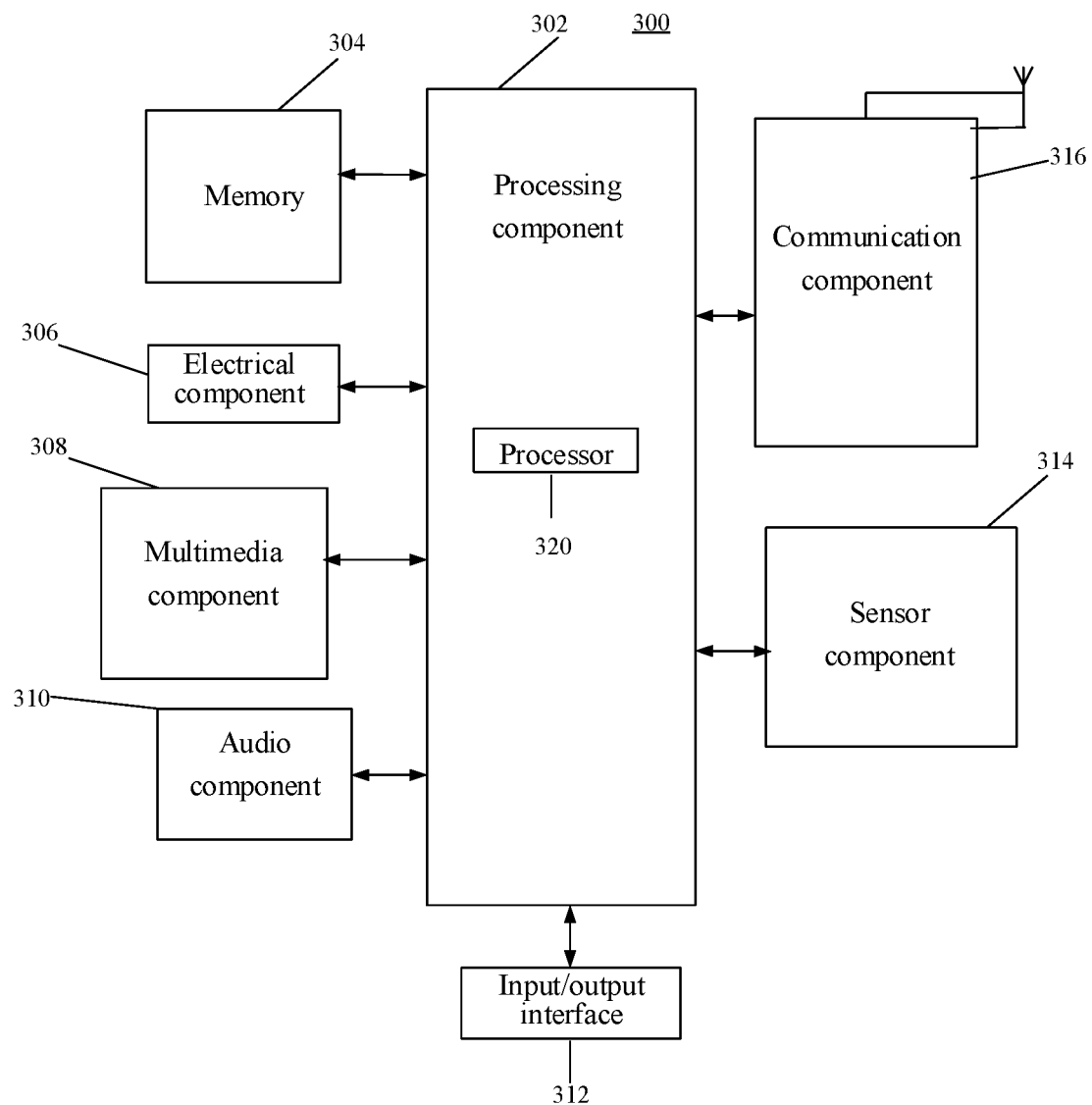
FIG. 6 is a block diagram of an apparatus shown according to an example.

FIG. 6 is a block diagram of a channel detection apparatus 300 shown according to an example. For example, the apparatus 300 may be a mobile phone, a computer, a digital broadcasting terminal, a message transmitter-receiver, a game console, a panel device, a medical device, a fitness device, a personal digital assistant and the like.

Referring to FIG. 6, the apparatus 300 may include one or more components of the following: a processing component 302, a memory 304, an electrical component 306, a multimedia component 308, an audio component 310, an input/output (I/O) interface 312, a sensor component 314 and a communication component 316.

The processing component 302 generally controls the overall operation of the apparatus 300, such as an operation associated with display, a telephone call, data communication, a camera operation and a record operation. The processing component 302 may include one or more processors 320 to execute instructions, so as to complete all or part of steps of the above method. In addition, the processing component 302 may include one or more modules to facilitate processing interactions between the processing component 302 and other components. For example, the processing component 302 may include a multimedia module to facilitate interactions between the multimedia component 308 and the processing component 302.

The memory 304 is configured to store all kinds of data to support operations in the apparatus 300. Examples of these data include instructions of any application programs or method operated on the apparatus 300, contact data, telephone directory data, messages, pictures, videos and the like. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 306 provides power for various components of the apparatus 300. The electrical component 306 may include a power management system, one or more power supplies, and other components associated with power generation, management and distribution for the apparatus 300.

The multimedia component 308 includes a screen providing an output interface between the apparatus 300 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, sliding and gestures on the touch panel. The touch sensor may sense not only boundaries of touch or sliding actions, but also the duration and pressure associated with the touch or sliding operation. In some examples, the multimedia component 308 includes a front-facing camera and/or a rear-facing camera. In response to determining that the apparatus 300 is in an operation mode, such as a shooting mode or a video mode, the front-facing camera and/or the rear-facing camera may receive external multimedia data. Each front-facing camera and the rear-facing camera may be a fixed optical lens system or have focal length and optical zoom capacity.

The audio component 310 is configured to output and/or input audio signals. For example, the audio component 310 includes a microphone (MIC), in response to determining that the apparatus 300 is in the operation mode, such as a call mode, a record mode and a voice recognition mode, the microphone is configured to receive the external audio signals. The received audio signals may be further stored in the memory 304 or sent by the communication component 316. In some examples, the audio component 310 further includes a loudspeaker for outputting the audio signals.

The I/O interface 312 provides an interface between the processing component 302 and a peripheral interface module, and the above peripheral interface module may be a keyboard, click wheels, buttons and the like. These buttons may include but are not limited to: a homepage button, a volume button, a start button and a lock button.

The sensor component 314 includes one or more sensors, and is configured to provide state evaluation of all aspects for the apparatus 300. For example, the sensor component 314 may detect an opening/closing state of the apparatus 300, and relative positioning of the components, for example, the components are a display and a keypad of the apparatus 300, and the sensor component 314 may further detect position change of the apparatus 300 or one component of the apparatus 300, existence or inexistence of touch of the user and the apparatus 300, orientation or accelerating/decelerating of the apparatus 300 and temperature change of the apparatus 300. The sensor component 314 may include a proximity sensor, and is configured to detect existence of nearby objects without any physical touch. The sensor component 314 may further include an optical sensor, such as a CMOS or a CCD image sensor, which is used in imaging application. In some examples, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may be switched in a wireless network based on the communication standard, such as WiFi, 2G or 3G, or their combination. In an example, the communication component 316 receives broadcast signals or broadcast related information from an external broadcast management system through a broadcast channel In an example, the communication component 316 further includes a near-field communication (NFC) module to promote short-range communication. For example, the NFC module may be implemented based on the radio frequency identification (RFID) technology, an infrared data association (IrDA) technology, an ultra wide band (UWB) technology, a Bluetooth (BT) technology and other technologies.

In the example, the apparatus 300 may be implemented by one or more application-specific integrated circuits (ASICs), digital signal processors (DSPs), digital signal processing device (DSPDs), programmable logic devices (PLDs), field programmable gate arrays (FPGAs), controllers, microcontrollers, microprocessors or other electrical components to execute the above method.

In the example, a non-temporary computer readable storage medium including instructions is further provided, such as the memory 304 including the instructions, and the above instructions may be executed by the processor 320 of the apparatus 300 to complete the above method. For example, the non-temporary computer readable storage medium may be an ROM, a random access memory (RAM), a CD-ROM, a magnetic tape, a floppy disk, an optical data storage device and the like.

Figure 7:
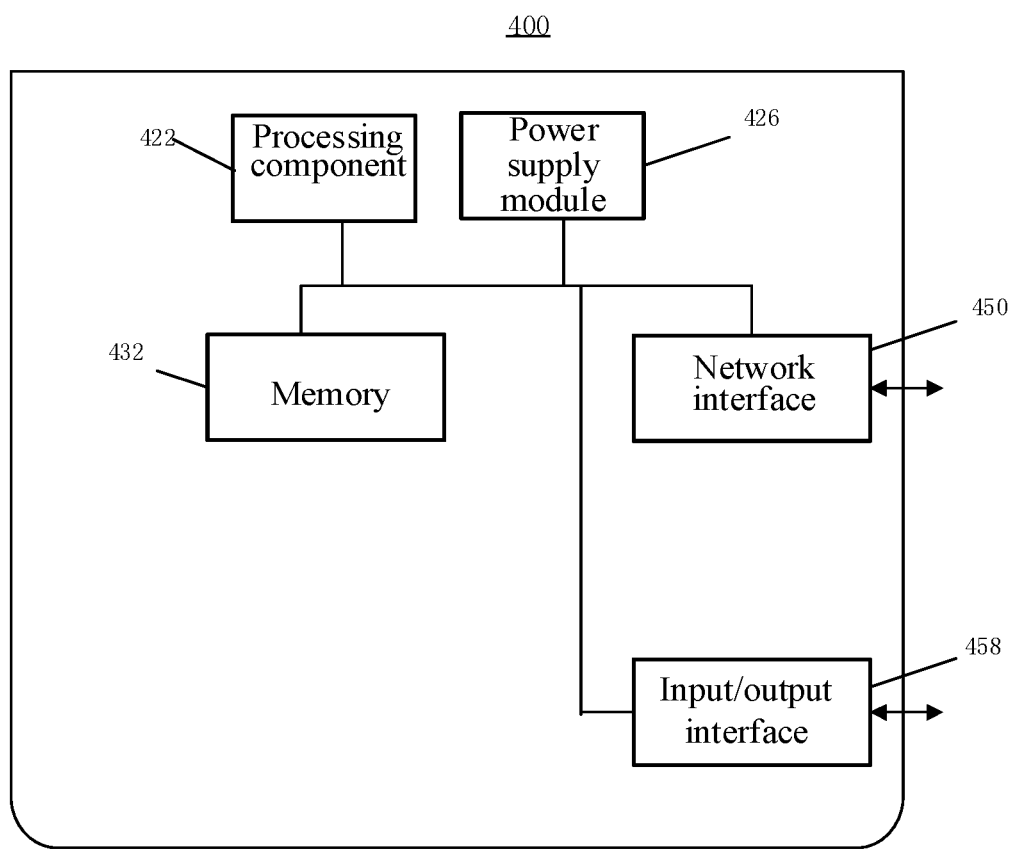
FIG. 7 is a block diagram of an apparatus shown according to an example.

FIG. 7 is a block diagram of a channel detection apparatus 400 shown according to an example. For example, the apparatus 400 may be provided as a server. Referring to FIG. 7, the apparatus 400 includes a processing component 422, the processing component 422 further includes one or more processors, and memory resources represented by a memory 432, for storing instructions executed by the processing component 422, such as application programs. The application programs stored in the memory 432 may include one or more modules each corresponding to a set of instructions. In addition, the processing component 422 is configured to execute the instructions to execute the above channel detection method.

The apparatus 400 may further include a power supply component 426 configured to execute the power supply management of the apparatus 400, a wired or wireless network interface 450 configured to connect the apparatus 400 to the network, and an input/output (I/O) interface 458. The apparatus 400 may operate based on an operation system stored in the memory 432, such as a Windows Server™, a Mac OS X™, a Unix™, a Linux™, a FreeBSD™ or the like.

It may further be understood that "a plurality of" in the disclosure refers to two or more than two, and other quantifiers are similar. "And/or" describes an associated relationship of associated objects, and represents that three relationships may exist, for example, A and/or B may represent that A exists alone, A and B exist at the same time, and B exists alone. The character "/" generally represents that the front and rear associated objects are in an "or" relationship. The singular forms of "a", "said" and "the" are also intended to include the plural form, unless the context clearly indicates otherwise.

It may further be understood that the terms "first", "second" and the like are used for describing various information, but the information should not be limited to these terms. These terms are only used for distinguishing the same type of information from each other, and do not represent a specific sequence or important degree. Actually, "first", "second" and other expressions can be used completely interchangeably. For example, within the scope of the disclosure, first information may also be called second information, and similarly, the second information may also be called the first information.

It may further be understood that although the operations are described in a specific order in the accompanying drawings in examples of the disclosure, it should not be understood that these operations are required to be executed in a shown specific order or a serial order, or all the shown operations are required to be executed to obtain a desired result. In a specific environment, multitask and parallel processing may be beneficial.

Those skills in the art will easily think of other implementation solutions of the disclosure after considering the specification and practicing the invention disclosed here. The present application is intended to cover any variations, use or adaptation of the disclosure, and these variations, use or adaptation conform to the general principles of the disclosure and include the common knowledge or customary technical means in the technical field not disclosed in the disclosure. The specification and the examples are only examples, and the true scope and spirit of the disclosure are indicated by the claims below.

It may be understood that the disclosure is not limited to the precise structure described above and shown in the accompanying drawings, and can be subjected to various modifications and changes within the scope. The scope of the disclosure is limited merely by the attached claims.

In order to solve the problem existing in the related art, the disclosure provides a channel detection method, a channel detection apparatus and a storage medium.

According to a first aspect of an example of the disclosure, a channel detection method is provided, performed by a terminal, and includes:
  determining a first prediction model, and the first prediction model being configured to predict a service execution time of the terminal; and determining, according to the service execution time predicted by the first prediction model, a channel detection occasion.

In one implementation, the first prediction model is obtained by training in advance based on service feature data and the service execution time, the service feature data are an input of the first prediction model, and the service execution time is an output of the first prediction model.

In one implementation, the service feature data include one or a combination of the following: a service type, a first service occurrence moment, a first service duration, a service interval time, a channel condition, terminal reception capacity, a terminal cell, a terminal using habit, and a moving track; and the service execution time includes one or a combination of the following: a second service occurrence moment and a second service duration.

In one implementation, determining the first prediction model includes:
  determining a first prediction model from a plurality of prediction models.

In one implementation, determining the first prediction model from the plurality of prediction models includes:
  determining, based on a received first indication message, the first prediction model from the plurality of prediction models, the first indication message including an indicator used for indicating the first prediction model; or
  determining, based on a corresponding relationship of terminal trigger operations and the prediction models, the first prediction model matched with a current terminal trigger operation from the plurality of prediction models.

In one implementation, the method further includes:
  receiving a second indication message, the second indication message being used for indicating the plurality of prediction models of the terminal.

In one implementation, determining, according to the service execution time predicted by the first prediction model, the channel detection occasion includes:
  determining at least one service occurrence moment included in the service execution time, and determining the at least one service occurrence moment as a detection occasion of a physical downlink control channel (PDCCH).

In one implementation, determining, according to the service execution time predicted by the first prediction model, the channel detection occasion includes:
  determining at least one service occurrence moment included in the service execution time, amending the at least one service occurrence moment, and determining the amended at least one service occurrence moment as a detection occasion of the physical downlink control channel (PDCCH).

In one implementation, the method further includes:
  receiving a third indication message, the third indication message being used for indicating the terminal to reconfigure one or more prediction models; and determining, according to the third indication message, the reconfigured one or more prediction models.

In one implementation, the method further includes:
  receiving a fourth indication message, the fourth indication message being used for indicating the terminal to activate and use the prediction models.

According to a second aspect of an example of the disclosure, a channel detection method is provided, performed by a network side device, and includes:
  determining a first prediction model, and the first prediction model being configured to predict a service execution time of a terminal; and determining, according to the service execution time predicted by the first prediction model, a channel detection occasion.

In one implementation, the first prediction model is obtained by training in advance based on service feature data and the service execution time, the service feature data are an input of the first prediction model, and the service execution time is an output of the first prediction model.

In one implementation, the service feature data include one or a combination of the following: a service type, a first service occurrence moment, a first service duration, a service interval time, a channel condition, terminal reception capacity, a terminal cell, a terminal using habit, and a moving track;

the service execution time includes one or a combination of the following: a second service occurrence moment and a second service duration.

In one implementation, determining the first prediction model includes:

determining the first prediction model from a plurality of prediction models.

In one implementation, determining the first prediction model from the plurality of prediction models includes:

determining, based on a sent first indication message, the first prediction model from the plurality of prediction models, the first indication message including an indicator used for indicating the first prediction model;

or determining, based on a corresponding relationship of terminal trigger operations and the prediction models, the first prediction model matched with a current terminal trigger operation from the plurality of prediction models.

In one implementation, the method further includes:

sending a second indication message, the second indication message being used for indicating the plurality of prediction models of the terminal.

In one implementation, configuring the plurality of prediction models includes:

downloading, based on a download position of the plurality of prediction models included in the second indication message, the plurality of prediction models;

or downloading, based on a download position included in pre-defined information, the plurality of prediction models.

In one implementation, determining, according to the service execution time predicted by the first prediction model, the channel detection occasion includes:

determining at least one service occurrence moment included in the service execution time, and determining the at least one service occurrence moment as a detection occasion of a physical downlink control channel (PDCCH).

In one implementation, determining, according to the service execution time predicted by the first prediction model, the channel detection occasion includes:

determining at least one service occurrence moment included in the service execution time, amending the at least one service occurrence moment, and determining the amended at least one service occurrence moment as a detection occasion of the physical downlink control channel (PDCCH).

In one implementation, the method further includes:

sending a third indication message, the third indication message being used for indicating the terminal to reconfigure one or more prediction models.

In one implementation, the method further includes:

sending a fourth indication message, the fourth indication message being used for indicating the terminal to activate and use the prediction models.

According to a third aspect of an example of the disclosure, a channel detection apparatus is provided, applied to a terminal, and includes:

a first determining module, configured to determine a first prediction model, the first prediction model being configured to predict a service execution time of the terminal; and a second determining module, configured to determine, according to the service execution time predicted by the first prediction model, a channel detection occasion.

In one implementation, the first prediction model is obtained by training in advance based on service feature data and the service execution time, the service feature data are an input of the first prediction model, and the service execution time is an output of the first prediction model.

In one implementation, the service feature data include one or a combination of the following: a service type, a first service occurrence moment, a first service duration, a service interval time, a channel condition, terminal reception capacity, a terminal cell, a terminal using habit, and a moving track; and the service execution time includes one or a combination of the following: a second service occurrence moment and a second service duration.

In one implementation, the first determining module is configured to determine the first prediction model from a plurality of prediction models.

In one implementation, the first determining module is configured to determine, based on the received first indication message, the first prediction model from the plurality of prediction models, the first indication message including an indicator used for indicating the first prediction model;

or determining, based on a corresponding relationship of terminal trigger operations and the prediction model, the first prediction model matched with a current terminal trigger operation from the plurality of prediction models.

In one implementation, the first determining module is further configured to receive the second indication message, the second indication message being used for indicating the plurality of prediction models of the terminal.

In one implementation, the first determining module is further configured to download, based on the download position of the plurality of prediction models included in the second indication message, the plurality of prediction models;

or downloading, based on the download position included in pre-defined information, the plurality of prediction models.

In one implementation, the second determining module is configured to determine at least one service occurrence moment included in the service execution time, and determine the at least one service occurrence moment as a detection occasion of the physical downlink control channel (PDCCH).

In one implementation, the second determining module is configured to determine at least one service occurrence moment included in the service execution time, amend the at least one service occurrence moment, and determine the amended at least one service occurrence moment as a detection occasion of the physical downlink control channel (PDCCH).

In one implementation, the first determining module is further configured to receive a third indication message, the third indication message being used for indicating the terminal to reconfigure one or more prediction models; and determine the reconfigured one or more prediction models according to the third indication message.

In one implementation, the first determining module is further configured to receive a fourth indication message, the fourth indication message being used for indicating the terminal to activate and use the prediction models.

According to a fourth aspect of an example of the disclosure, a channel detection apparatus is provided, applied to a network side device, and includes:
  a third determining module, configured to determine a first prediction model, the first prediction model being configured to predict a service execution time of a terminal; and
  a fourth determining module, configured to determine, according to the service execution time predicted by the first prediction model, a channel detection occasion.

In one implementation, the first prediction model is obtained by training in advance based on service feature data and the service execution time, the service feature data are an input of the first prediction model, and the service execution time is an output of the first prediction model.

In one implementation, the service feature data include one or a combination of the following: a service type, a first service occurrence moment, a first service duration, a service interval time, a channel condition, terminal reception capacity, a terminal cell, a terminal using habit, and a moving track; and
  the service execution time includes one or a combination of the following: a second service occurrence moment and a second service duration.

In one implementation, the third determining module is configured to:
  determine a first prediction model from a plurality of prediction models.

In one implementation, the third determining module is configured to:
  determine, based on a sent first indication message, the first prediction model from the plurality of prediction models, the first indication message including an indicator used for indicating the first prediction model;
  or
  determine, based on a corresponding relationship of terminal trigger operations and the prediction model, the first prediction model matched with a current terminal trigger operation from the plurality of prediction models.

In one implementation, the third determining module is further configured to:
  send a second indication message, the second indication message being used for indicating the plurality of prediction models of the terminal.

In one implementation, the fourth determining module is configured to:
  determine at least one service occurrence moment included in the service execution time, and determine the at least one service occurrence moment as a detection occasion of a physical downlink control channel (PDCCH).

In one implementation, the fourth determining module is configured to:
  determine at least one service occurrence moment included in the service execution time, amending the at least one service occurrence moment, and determine the amended at least one service occurrence moment as a detection occasion of the physical downlink control channel (PDCCH).

In one implementation, the third determining module is further configured to:
  send a third indication message, the third indication message being used for indicating the terminal to reconfigure one or more prediction models.

In one implementation, the third determining module is further configured to:
  send a fourth indication message, the fourth indication message being used for indicating the terminal to activate and use the prediction models.

According to a fifth aspect of an example of the disclosure, a channel detection apparatus is provided and includes:
  a processor; and a memory configured to store executable instructions of the processor; the processor being configured to execute the channel detection method in the first aspect or any one of implementations in the first aspect, or configured to execute the channel detection method in the second aspect or any one of implementations in the second aspect.

According to a sixth aspect of an example of the disclosure, a non-temporary computer readable storage medium is provided, in response to determining that instructions in the storage medium are executed by a processor of a mobile terminal, the mobile terminal can execute the channel detection method in the first aspect or any one of implementations in the first aspect, or execute the channel detection method in the second aspect or any one of implementations in the second aspect.

The technical solution provided by the example of the disclosure may include the following beneficial effects: determining the first prediction model through the disclosure, and determining, according to the service execution time predicted by the first prediction model, the channel detection occasion; the first prediction model being configured to predict the service execution time of the terminal; and according to the channel detection occasion determined by the disclosure, the power overhead can be effectively reduced.

The invention claimed is:

1. A channel detection method, performed by a terminal, and comprising:
  determining a first prediction model, the first prediction model being configured to predict a service execution time of the terminal; and
  determining, according to the service execution time predicted by the first prediction model, a channel detection occasion;
  wherein the first prediction model is obtained by training in advance based on service feature data and the service execution time, and the service feature data are an input of the first prediction model, and the service execution time is an output of the first prediction model; and
  wherein the service feature data comprise one or a combination of the following: a service type, a first service occurrence moment, a first service duration, a service interval time, a channel condition, terminal reception capacity, a terminal cell, a terminal using habit, and a moving track; and the service execution time comprises one or a combination of the following: a second service occurrence moment and a second service duration.

2. The channel detection method according to claim 1, wherein determining the first prediction model comprises:
  determining the first prediction model from a plurality of prediction models.

3. The channel detection method according to claim 2, wherein determining the first prediction model from the plurality of prediction models comprises one of the following:
    determining, based on a received first indication message, the first prediction model from the plurality of prediction models, the received first indication message comprising an indicator used for indicating the first prediction model;
    or
    determining, based on a corresponding relationship of terminal trigger operations and the plurality of prediction models, the first prediction model matched with a current terminal trigger operation from the plurality of prediction models.

4. The channel detection method according to claim 2, wherein the channel detection method further comprises:
    receiving a second indication message, the second indication message being used for indicating the terminal to configure the plurality of prediction models.

5. The channel detection method according to claim 4, wherein configuring the plurality of prediction models comprises one of the following:
    downloading, based on a download position of the plurality of prediction models comprised in the second indication message, the plurality of prediction models;
    or
    downloading, based on a download position comprised in pre-defined information, the plurality of prediction models.

6. The channel detection method according to claim 1, wherein determining, according to the service execution time predicted by the first prediction model, the channel detection occasion comprises:
    determining at least one service occurrence moment comprised in the service execution time, and determining the at least one service occurrence moment as a detection occasion of a physical downlink control channel (PDCCH).

7. The channel detection method according to claim 1, wherein determining, according to the service execution time predicted by the first prediction model, the channel detection occasion comprises:
    determining at least one service occurrence moment comprised in the service execution time, amending the at least one service occurrence moment, and determining the amended at least one service occurrence moment as a detection occasion of a physical downlink control channel (PDCCH).

8. The channel detection method according to claim 1, wherein the channel detection method further comprises:
    receiving a third indication message, the third indication message being used for indicating the terminal to reconfigure one or more prediction models; and
    determining, according to the third indication message, the reconfigured one or more prediction models.

9. The channel detection method according to claim 1, wherein the channel detection method further comprises:
    receiving a fourth indication message, the fourth indication message being used for indicating the terminal to activate and use the first prediction model.

10. A channel detection method, performed by a network side device, and comprising:
    determining a first prediction model, the first prediction model being configured to predict a service execution time of a terminal; and
    determining, according to the service execution time predicted by the first prediction model, a channel detection occasion;
    wherein the first prediction model is obtained by training in advance based on service feature data and the service execution time, and the service feature data are an input of the first prediction model, and the service execution time is an output of the first prediction model; and
    wherein the service feature data comprise one or a combination of the following: a service type, a first service occurrence moment, a first service duration, a service interval time, a channel condition, terminal reception capacity, a terminal cell, a terminal using habit, and a moving track; and the service execution time comprises one or a combination of the following: a second service occurrence moment and a second service duration.

11. The channel detection method according to claim 10, wherein determining the first prediction model comprises:
    determining the first prediction model from a plurality of prediction models.

12. The channel detection method according to claim 11, wherein determining the first prediction model from the plurality of prediction models comprises one of the following:
    determining, based on a sent first indication message, the first prediction model from the plurality of prediction models, the sent first indication message comprising an indicator used for indicating the first prediction model;
    or
    determining, based on a corresponding relationship of terminal trigger operations and the plurality of prediction models, the first prediction model matched with a current terminal trigger operation from the plurality of prediction models.

13. The channel detection method according to claim 11, wherein the channel detection method further comprises:
    sending a second indication message, the second indication message being used for indicating the terminal to configure the plurality of prediction models.

14. The channel detection method according to claim 10, wherein determining, according to the service execution time predicted by the first prediction model, the channel detection occasion comprises:
    determining at least one service occurrence moment comprised in the service execution time, and determining the at least one service occurrence moment as a detection occasion of a physical downlink control channel (PDCCH).

15. A channel detection apparatus, applied to a network side device, comprising:
    a processor; and
    a memory configured to store executable instructions of the processor, wherein
    the processor is configured to execute the executable instructions to perform the channel detection method according to claim 10.

16. A channel detection apparatus, applied to a terminal, comprising:
    a processor; and
    a memory configured to store executable instructions of the processor, wherein
    the processor is configured to:
        determine a first prediction model, the first prediction model being configured to predict a service execution time of the terminal; and determine, according to the service execution time predicted by the first prediction model, a channel detection occasion;

wherein the first prediction model is obtained by training in advance based on service feature data and the service execution time, and the service feature data are an input of the first prediction model, and the service execution time is an output of the first prediction model; and wherein the service feature data comprise one or a combination of the following: a service type, a first service occurrence moment, a first service duration, a service interval time, a channel condition, terminal reception capacity, a terminal cell, a terminal using habit, and a moving track; and the service execution time comprises one or a combination of the following: a second service occurrence moment and a second service duration.

* * * * *